Jan. 21, 1969   H. B. LLOYD   3,422,814
APPARATUS FOR THE INTERNAL MEDICATION OF ANIMALS
Filed April 14, 1966
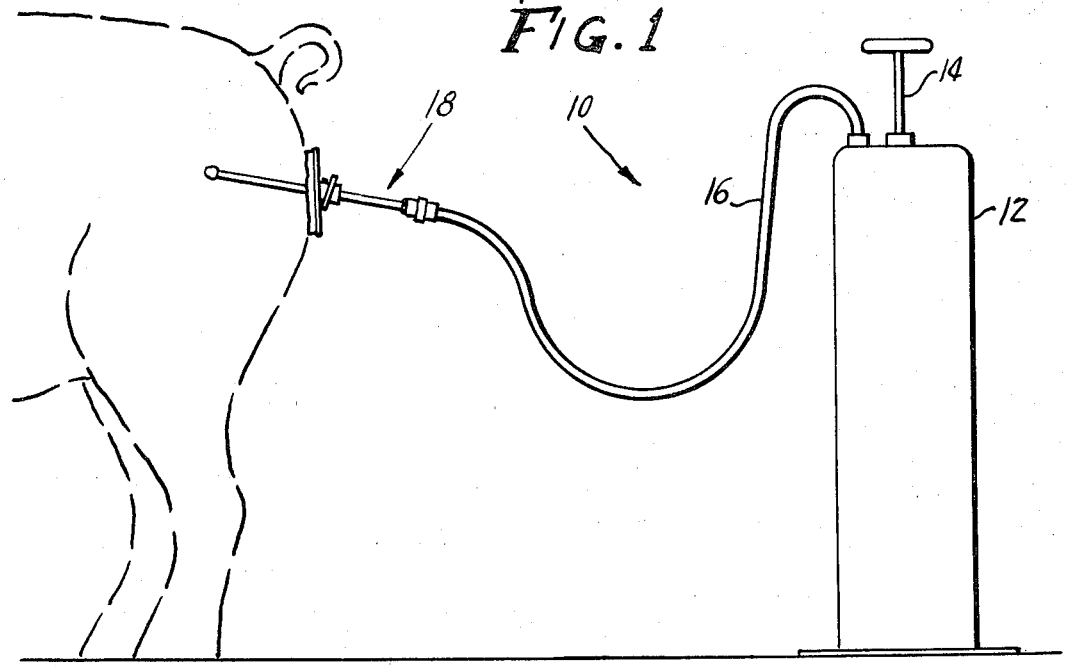
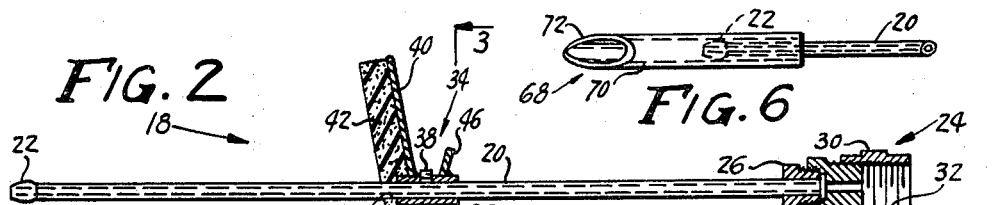
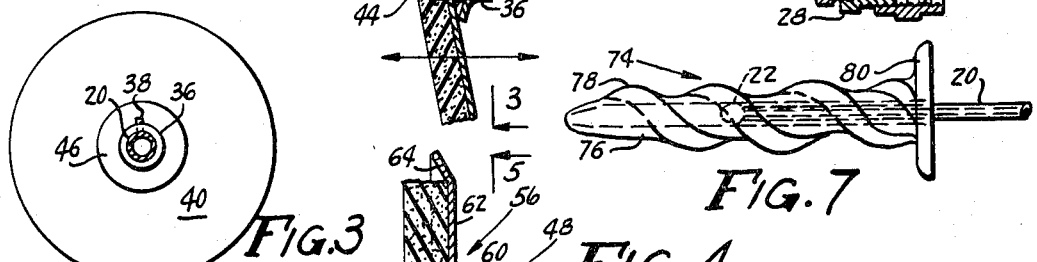
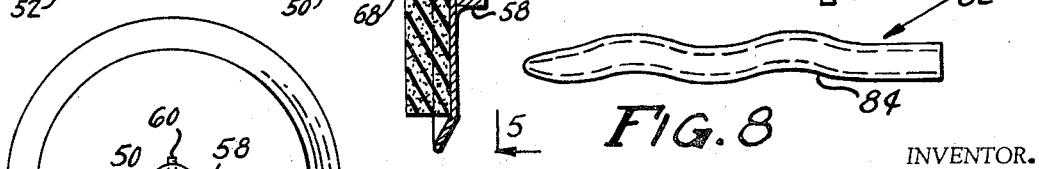
INVENTOR.
HAROLD B. LLOYD
BY *Kimmel, Crowell & Weaver*
ATTORNEYS.

United States Patent Office 3,422,814
Patented Jan. 21, 1969

3,422,814
**APPARATUS FOR THE INTERNAL
MEDICATION OF ANIMALS**
Harold B. Lloyd, 2037 S. Cedar St.,
Sioux City, Iowa 51106
Filed Apr. 14, 1966, Ser. No. 542,663
U.S. Cl. 128—245                1 Claim
Int. Cl. A61m 3/00

ABSTRACT OF THE DISCLOSURE

An elongated hollow rigid tube for irrigating the uterus of a sow, said tube having a fluid inlet end extendible through the vagina of the sow into its uterus and a fluid inlet end positioned externally of the vagina for connection to a source of a liquid medicant under pressure, a shield mounted for selective movement axially of the tube to permit the effective length thereof to be varied in accordance with the physical characteristics of the sow, and a resilient pad on said plate to be engaged with and to seal the vagina of the sow to prevent the escape of the liquid medicant injected into the uterus through said tube.

---

This invention relates to a method and device for irrigating or cleaning the uterus of sows.

One of the problems in raising and managing a swine herd is the occurrence of the diseases metritis, mastitis and agalactia in brood sows. These diseases are interrelated in a complex manner not yet fully understood. Metritis is, of course, an inflammation of the vagina while mastitis is the inflammation of the mammary glands. Agalactia is a disease involving the loss of milk of the sow shortly after farrowing.

Although the causes of these diseases have not been fully analyzed, they appear to fall into three general categories: (1) overfeeding of sows immediately prior to farrowing or under-exercising of sows during gestation; (2) bacterial infections caused by E. coli, streptococci, staphylococci, hemolytic micrococci and mixed bacterial flora; and (3) a few cases may be associated with toxemia from fetal death in terminal weeks of pregnancy, retained placenta or retained piglets. The physical stress associated with farrowing, uterine fatigue, and atony of the uterine musculature, retention of shreds of the placenta, or a retained fetus is conducive to uterine infection and inflammation. Mastitis with resulting agalactia is most often associated with metritis although it may be a separate problem in some cases.

In treating these diseases, one approach is directed toward removal of as much of the infection from the uterus as possible. This may be accomplished through the use of smooth muscle stimulants, such as posterior pituitary extract exemplified by stilbestrol, and gentle lavage using a warm saline solution. After the saline solution has been expelled, mineral oil and soluble tetracycline introduced into the uterus either through gravity flow or a dose syringe will help overcome the uterine infection.

The most common method of treatment is the use of broad spectrum antibiotics and other selected drugs injected intramuscularly. Selection of these drugs is quite critical in view of the variation of the bacterial causes found in different herds as well as various bacterial causes within a single herd at different times. It is not uncommon to find that drug therapy will have to be changed within a herd within as short a period as ten days. This is particularly true where the E. coli is the causative bacteria since it has the ability to change rapidly in its resistance to drugs.

The remaining mode of handling infected sows is merely a salvage operation and does not include medical treatment. At the first appearance of symptoms of the disase, infected sows are removed from the herd and retained in isolation until marketed. Since prolific brood sows are much more valuable as breeders than as slaughter animals, it is manifest that this handling of sows is most unprofitable.

It is an object of the instant invention to provide a method for treating brood sows after farrowing by injecting a cleaning medium into the uterus until it is expanded and then allowing the excess to be expelled therefrom.

Another object of the instant invention is to provide a method of treating female swine for mastitis, metritis and agalactia by injecting a cleaning medium into the uterus until it is mildly expanded.

Still another object of the instant invention is to provide a method of treating infected brood sows by injecting a cleansing medium into the uterus and placing a soft pad in seating engagement about the vagina during the injecting step to mildly enlarge or balloon the uterus.

A further object of the instant invention is to provide a device for accomplishing the method of the instant invention.

A still further object of the istant invention is to provide a device for irrigating the uterus of a sow in which a deflector plate is mounted about a liquid transporting tube to deflect cleansing medium expelled by the sow away from the operator.

Still another object of the instant invention is to provide a sow irrigating device including a soft resilient pad surrounding a liquid transporting tube for selectively preventing the escape of the injected liquid from the vagina of the sow.

A further object of the instant invention is to provide a device for irrigating the uterus of a sow having a liquid deflecting plate surrounding a liquid transporting tube in which the plate is adjustably mounted to vary the physical characteristics of the irrigation device in accordance with the physical characteristics of the sow.

Other objects and advantages of the instant invention reside in the combinations of elements and manipulative steps, arrangements of parts and manipulative steps, and features of construction and operation, all as will be more fully pointed out hereinafter and disclosed in the accompanying drawings wherein there is shown a preferred embodiment of this inventive concept.

In the drawing:

FIGURE 1 is a over-all organizational view of the system by which a cleansing medium is injected into the uterus of the sow shown in dashed lines;

FIGURE 2 is a longitudinal cross-sectional view of one form of irrigating device of the instant invention;

FIGURE 3 is a transverse cross-sectional view of the cleaning device of FIGURE 2 taken substantially along line 3—3 thereof as viewed in the direction indicated by the arrows;

FIGURE 4 is a longitudinal cross-sectional view of another form of cleansing device of the instant invention;

FIGURE 5 is a transverse cross-sectional view of the cleaning device of FIGURE 4 taken substantially along line 5—5 thereof as viewed in the direction indicated by the arrows;

FIGURE 6 is a side elevational view of a modified form of liquid injecting tip which may be utilized with the devices of FIGURES 2 and 4;

FIGURE 7 is another modified form of liquid injecting tip which may be inserted over the outlet end of the tubular conduit of the devices of FIGURES 2 and 4; and FIGURE 8 is still another form of extension that may be inserted on the outlet end of the liquid carrying tube of the devices of FIGURES 2 and 4.

Referring now to the drawing in detail, wherein like reference characteristics designate like elements throughout the several views thereof, there is shown generally at 10 a system for irrigating the uterus of a sow comprising a liquid carrying tank 12 encapsulating a conventional pumping mechanism (not shown), a hand-operated plunger 14 operatively connected to the pumping mechanism, an outlet hose 16 delivering pressurized liquids from the pumping mechanism to a cleaning device of the instant invention shown generally at 18. In the general operation of the instant invention, the outlet end of cleaning device 18 will be inserted into the sow's uterus followed by the reciprocation of plunger 14 to deliver a cleansing medium into the uterus. The operator will initially hold cleaning device 18 firmly against the vagina to expand the uterus. The operator will next partially remove cleaning device 18 to allow the discharge of a substantial portion of the cleansing medium. The operator will then remove outlet hose 16 from cleaning device 18 and couple another delivery hose to cleaning device 18. A similar pressurizing device will preferably be actuated to deliver a medicated medium, such as tetracycline or the like, into the sow's uterus without producing substantial expansion of the uterus.

Referring now to FIGURES 2 and 3, cleaning device 18 is illustrated as including an elongate, rigid transporting tube 20 having an enlargement 22 at the outlet end thereof. The inlet end of tube 20 includes a releasable connection shown generally at 24 comprised of a male plug 26 affixed on the inlet end of tube 20. An adapter 28 is threadedly received on male plug 26 and is in turn received in a collar 30 which is illustrated as having female threads 32 but which may include a quick disconnect device.

Mounted on the outer periphery of tube 20 and intermediate the ends thereof, is an adjustable pressure pad shown generally at 34. Pressure pad 34 includes a sleeve 36 slidably mounted on tube 20 carrying a conventional set screw 28 which may be rotated into engagement with tube 20 for temporarily fixing the position of pressure pad 34 onto tube 20. Sleeve 36 fixedly carries a first circular plate 40 angled down and toward the outlet end of tube 20. A resilient pad 42, made of sponge rubber or a resilient foamed plastic, substantially co-extensive with plate 40 is provided with a central opening 44 receiving tube 20 thereby affixing pad 42 closely adjacent plate 40. A second angled circular plate 46 is affixed to sleeve 36 in converging relation with plate 40 and provides a thumb and forefinger rest for the operator when using cleaning device 18. It may be advantageous, from time to time, to provide a multiplicity of resilient pads 42 on tube 20 which may be done by merely sliding another pad onto tube 20.

An important feature of the instant invention resides in the adjustability of pressure pad 34. As previously mentioned, pad 34 is utilized to seal the sow's vagina to prevent the discharge of the cleaning medium in order to expand the uterus. Since it is desirable to inject the cleaning medium as far as possible into the uteral tract, the distance between pressure pad 34 and outlet end 22 of tube 20 should be a maximum without injuring the sow. Since it is necessary to place pressure pad 34 against the vagina, it will be apparent that the distance between outlet end 42 and pressure pad 34 may vary depending upon the age and size of the sow. Another advantage of the angled nature of plate 40 is the requirement for a device to deflect the drainage from the sow's uterus away from the operator.

Referring now to FIGURES 4 and 5, another form of cleaning device of the instant invention is shown generally at 48 and is comprised of an elongate tube 50 having an enlarged outlet end 52 and a male inlet plug 54 for insertion into adapter 28 of releasable connection 24. An adjustably mounted pressure pad shown generally at 56 is comprised of a sleeve 58 carrying a conventional set screw 60 for adjustably mounting pressure pad 56 intermediate the ends of tube 50. Another component of pressure pad 56 is an enlarged circular plate 62, affixed to sleeve 58 having a forwardly diverging lip 64 acting to deflect a substantial portion of the discharge away from the operator's station. A resilient pad 66 is provided with a central opening 68 closely receiving tube 50 to position pad 66 closely adjacent plate 62 and covering substantially the entire extent thereof.

In the use of cleaning devices 18, 48, the operator will adjust pressure pad 34, 56 to the appropriate length in accordance with the size and age of the sow to be treated. Connection 24 will be threadedly attached to plug 26, 54 in preparation to the delivering of the cleaning medium through tube 20. The operator and his assistant will corner the sow to be treated and preferably hold her in a position where she cannot readily run off, as in a confined chute or the like. The individual will insert the outlet end of tube 20 into the sow's uterus and reciprocate plunger 14 to deliver pressurized liquids within the uterus to expand it. The pumping mechanism utilized with the instant invention is preferably equipped with a pressure regulator to preclude injury to the sow from high pressure liquids.

The operator will closely press pressure pad 34, 56 against the vagina for temporarily preventing discharge of the cleansing medium from the uterus until a ballooning or expansion of the uterus is assured. At this point the operator may withdraw cleaning device 18, 48 slightly to allow the discharge of the cleaning medium. The operator may then remove outlet hose 16 from cleaning device 18 and attach another liquid dispensing device to inject a medicating material into the uterus. During this second injection step, it is preferred that the operator does not press pressure pad 34, 56 against the sow's uterus to avoid ballooning of the uterus and consequently loss of the medicated medium after the removal of the pressure pad. It should be understood, however, that a second enlargement of the uterus may be effected. It is also apparent that the medicated medium may be injected by use of a separate mechanism similar to device 18.

Referring now to FIGURE 6, an extension shown generally at 68 is slipped over the outlet end of tube 20 to provide a more gentle means of inserting tube 20 into the uterus. Extension 68 is preferably made of an elongate plastic tube 70, such as polyethylene or the like, having a beveled outlet face 72 for dispensing the cleansing medium and medicated material. It should be readily apparent that extension 68 is somewhat softer and more resilient than the end of tube 20 and may be inserted through the uteral canal with much less discomfort to the sow than can the rigid metal tube 20.

Referring now to FIGURE 7, another form of extension is shown generally at 74 slipped over the terminal end of tube 20 and is configured to simulate a boar's penis. Extension 74 includes a central shank 76 having a helically wound ridge 78 therearound terminating in a plate 80 substantially perpendicular to tube 20. Again, the purpose of extension 78 is to facilitate the insertion of liquid transporting tube 20 into the sow's uterus.

Referring now to FIGURE 8, another form of extension is shown generally at 82 comprised of a tube 84 configured in a wave type arrangement which has been found easier, simpler and less expensive to manufacture than the more realistic extension 74. Extension 82 will be used in the same fashion as extensions 68 and 74 with tube 20 being inserted into the inlet end thereof.

It is now seen that there is herein provided an improved method and device for irrigating sow's uterus having all of the objects and advantages of the instant invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in limiting sense.

I claim:

1. A device for irrigating the uterus of a sow and comprising a semi-rigid liquid transporting tube having opposed inlet and outlet ends, said tube being of such length as to enable said outlet end to extend through the vagina into the uterus with the inlet end being positioned externally of the vagina;

said tube having a resilient extension on the outlet end thereof to facilitate its extension into the uterus;

a substantially rigid planar plate mounted on said tube and inclined to the longitudinal axis thereof, said plate being positioned adjacent said inlet end of said rigid tube;

means adjustably mounting said plate intermediate its said ends for selectively altering the distance of said plate relative to said outlet end to vary the physical characteristics of the irrigation device in accordance with the physical characteristics of the sow;

a soft resilient pad surrounding said tube on the outlet side of said plate for preventing the escape of a liquid injected into the uterus through the outlet end of said tube, said pad being of such size as to be substantially coextensive with said plate;

liquid pump means; and means connecting said pump means with the inlet end of said tube.

References Cited

UNITED STATES PATENTS

| | | | |
|---|---|---|---|
| 806,188 | 12/1905 | Rees | 128—245 |
| 1,114,561 | 10/1914 | Wilde | 128—245 |
| 2,185,927 | 1/1940 | Shelanski | 128—245 XR |
| 2,457,244 | 12/1948 | Lamson | 128—246 |

RICHARD A. GAUDET, *Primary Examiner.*

JOHN YASKO, *Assistant Examiner.*